(12) United States Patent
Roberson

(10) Patent No.: US 6,411,777 B2
(45) Date of Patent: Jun. 25, 2002

(54) METHOD FOR PREPARING INFANT FORMULA FROM POWDER WITH DISPENSING AND FILTERING MEANS

(76) Inventor: Danny J. Roberson, 315 Canterbury, Euless, TX (US) 76039

( * ) Notice: Subject to any disclaimer, the term of this patent is extended or adjusted under 35 U.S.C. 154(b) by 0 days.

(21) Appl. No.: 09/789,044

(22) Filed: Feb. 20, 2001

Related U.S. Application Data

(63) Continuation of application No. 09/455,963, filed on Dec. 6, 1999, which is a division of application No. 08/934,712, filed on Sep. 22, 1997, now Pat. No. 5,855,236, which is a continuation-in-part of application No. 08/265,412, filed on Jun. 24, 1994, now Pat. No. 5,671,325, which is a continuation of application No. 07/981,791, filed on Nov. 25, 1992, now abandoned.

(51) Int. Cl.[7] .................................................. A47J 27/00
(52) U.S. Cl. ..................... 392/442; 392/444; 222/146.5
(58) Field of Search .......................... 392/442, 444–451; 222/146.5, 146.1, 129.1, 189.06, 189.11; 426/402, 520, 807; 99/483, 304–315; 210/466, 468

(56) References Cited

U.S. PATENT DOCUMENTS

| 1,910,933 A | 5/1933 | Santurello |
| 2,209,430 A | 7/1940 | Turshin |
| 2,215,688 A | 9/1940 | Chamberlain |
| 2,340,932 A | 2/1944 | Chalupa |
| 2,409,512 A | 10/1946 | Mungo |

(List continued on next page.)

FOREIGN PATENT DOCUMENTS

| CH | A 456885 | 7/1968 |
| DE | 2907495 | 9/1980 |
| DE | 3511159 | 10/1986 |
| DE | 9203538 | 7/1993 |
| DE | 29/611088 | 1/1997 |
| FR | 2561893 | 10/1985 |
| FR | 2620017 | 3/1989 |
| GB | 1367354 | 9/1974 |
| GB | 2019813 | 11/1979 |
| GB | 2143625 A | 2/1985 |

(List continued on next page.)

OTHER PUBLICATIONS

Nriagu, J.O., Editor, "The Biogeochemistry of Lead in the Environment," Topics in Environmental Health, p. 243.
Sigman–Grant, PHD, M., "Microwave Heating of Infant Formula: A Dilemma Resolved," Pediatrics, vol. 90 (No. 3), p. 412, (Sep. 20, 1992).
Sando, M.D., W.C., et al., "Risk Factors for Microwave Scaled Injuries in Infants," The Journal of Pediatrics, vol. 105 (No. 6), p. 864, (Dec. 20, 1984).
Shannon, M.D., Michael W., et al., "Lead Intoxication in Infancy," Pediatrics, vol. 89 (No. 1), p. 87, (Jan. 20, 1992).
Nemethy, RN, Margaret, "Microwave Heating of Infant Formula and Breast Milk," Journal of Pediatric Health Care, p. 131, (Jan. 20, 1990).

(List continued on next page.)

*Primary Examiner*—Teresa Walberg
*Assistant Examiner*—Thor Campbell
(74) *Attorney, Agent, or Firm*—Munsch Hardt Kopf & Harr, P.C.

(57) ABSTRACT

An apparatus and method for preparing infant formula from powdered formula dispenses water at a temperature substantially in a range around body temperature into a baby bottle containing powdered infant formula for mixing and immediate feeding to a baby, thereby avoiding unnecessary inconvenience to the baby's caregiver associated with typical methods of preparing infant formula for feeding. The water is filtered, disinfected and heated to the appropriate temperature for dispensing on demand.

1 Claim, 8 Drawing Sheets

U.S. PATENT DOCUMENTS

| | | |
|---|---|---|
| 2,529,672 A | 11/1950 | Black |
| 2,784,879 A | 3/1957 | Fischer |
| 2,819,377 A | 1/1958 | Brown |
| 3,143,636 A | 8/1964 | Lupovich |
| 3,200,997 A | 8/1965 | Creswick |
| 3,218,175 A | 11/1965 | Siegel et al. |
| 3,269,606 A | 8/1966 | Armstrong |
| 3,311,266 A | 3/1967 | Ward |
| 3,335,910 A | 8/1967 | Rossi |
| 3,352,460 A | 11/1967 | Herring |
| 3,402,763 A | 9/1968 | Peterson |
| 3,551,091 A | 12/1970 | Veloz |
| 3,576,426 A | 4/1971 | Sesholtz |
| 3,658,122 A | 4/1972 | Kalyk |
| 3,896,289 A | 7/1975 | Di Renna |
| 3,955,713 A | 5/1976 | Hurley |
| 4,055,279 A | 10/1977 | Lapera et al. |
| 4,116,246 A | 9/1978 | Franzen |
| 4,124,793 A | 11/1978 | Colman |
| 4,133,456 A | 1/1979 | Corini |
| 4,139,125 A | 2/1979 | Arzberger et al. |
| 4,163,471 A | 8/1979 | Leder |
| 4,597,435 A | 7/1986 | Fosco, Jr. |
| 4,614,859 A | 9/1986 | Beckering et al. |
| 4,762,613 A | 8/1988 | Snowball |
| 4,766,321 A | 8/1988 | Lew et al. |
| 4,791,860 A | 12/1988 | Verheijen |
| 4,818,114 A | 4/1989 | Ghavi |
| 4,857,204 A | 8/1989 | Joklik |
| 4,867,048 A | 9/1989 | Brewer |
| 4,872,317 A | 10/1989 | Reed |
| 4,889,973 A | 12/1989 | Farinacci et al. |
| 4,909,931 A | 3/1990 | Bibi |
| 4,917,005 A | 4/1990 | Knepler |
| 4,971,687 A | 11/1990 | Anderson |
| 4,975,562 A | 12/1990 | Friedman |
| 4,993,593 A | 2/1991 | Fibiano et al. |
| 5,002,226 A | 3/1991 | Nelson |
| 5,027,696 A | 7/1991 | Antonini |
| 5,038,752 A | 8/1991 | Anson |
| 5,057,667 A | 10/1991 | Bell et al. |
| 5,058,195 A | 10/1991 | Knepler |
| 5,063,836 A | 11/1991 | Patel |
| 5,111,969 A | 5/1992 | Knepler |
| 5,125,068 A | 6/1992 | McNair et al. |
| 5,392,694 A | 2/1995 | Muller et al. |
| 5,397,031 A | 3/1995 | Jensen |
| 5,570,816 A | 11/1996 | LaBarbera, Jr. |
| 5,597,482 A | 1/1997 | Melyon |
| 5,671,325 A | 9/1997 | Roberson |
| 5,797,313 A | 8/1998 | Rothley |
| 6,118,933 A * | 9/2000 | Roberson .................... 392/442 |

FOREIGN PATENT DOCUMENTS

| | | |
|---|---|---|
| GB | 2214355 A | 8/1989 |
| GB | 2240465 A | 8/1991 |
| GB | 97/47224 | 12/1997 |
| WO | 89/02239 | 3/1989 |
| WO | 96/03067 | 2/1996 |

OTHER PUBLICATIONS

U.S. Dept. of Health and Human Services, "Strategic Plan for the Elimination of Childhood Lead Poisoning," (Feb. 20, 1991).

"Listoriosis–A 'new' Infection Linked to Contaminated Foods", Child Health Alert, p. 3, (Oct. 1988).

"Airway Burns in an Infant Following Aspiration of Microwave–Heated Tea", Chest, vol. 90 (No. 4), p. 621, (Oct. 1985).

"Palatal Burn Due to Bottle Warming in a Microwave Oven", Pediatrics, vol. 82 (No. 3), p. 382, (Sep. 1987).

"Hazard of Lead in Infant Formula", Correspondence, New England Journal of Medicine, vol. 89 (No. 1), p. 87, (Jan. 1992).

"Burn Injury Related to the Improper Use of a Microwave Oven", Pediatrics, vol. 72 (No. 5), p. 714, (Nov. 1983).

Rodriguez, Jesse, "An Introduction to UV Disinfection," reprinted from Water Conditioning and Purification, (Aug. 20, 1996).

Sales Brochure: Aquatronic System, Inc., "Ultraviolet Advantage,".

Sales Brochure: Ideal Horizons, "UV Treatment Systems,".

Sales Brochure: Ideal Horizons, "Multistage Series,".

Sales Brochure: Ideal Horizons, "SV, SS & SSW Series,".

Sales Brochure: Ideal Horizons, "IH/SR Series,".

Sales Brochure: Ideal Horizons, "LBR Series,".

Sales Brochure: Ideal Horizons, "LCI Series,".

Sales Brochure: Ideal Horizons, "S Series,".

Sales Brochure: Ideal Horizons, "R Series,".

Sales Brochure: Ideal Horizons, "IH–2L Series,".

Sales Brochure: Ideal Horizons, "Ultraviolet Disinfection Plus Filtration,".

Sales Brochure: Living Water, "Pure Refreshment and More,".

* cited by examiner

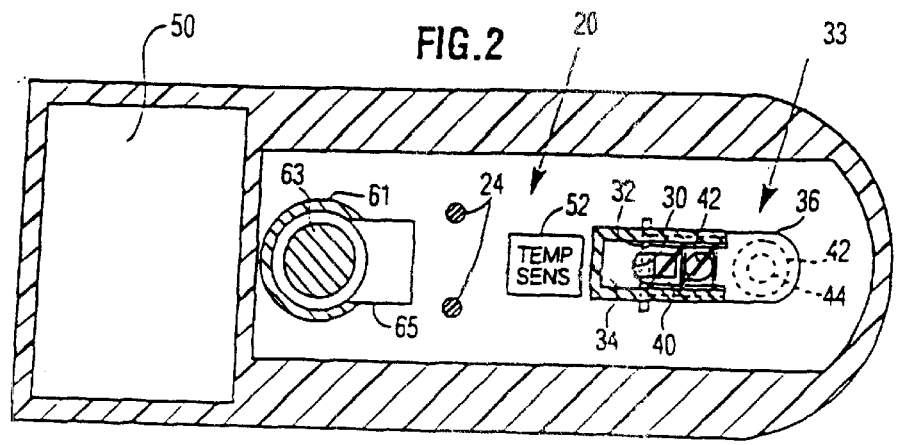
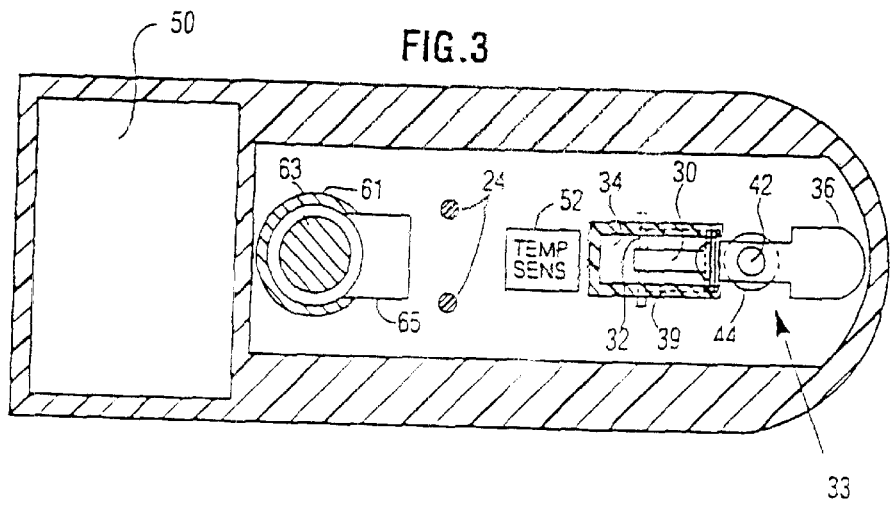
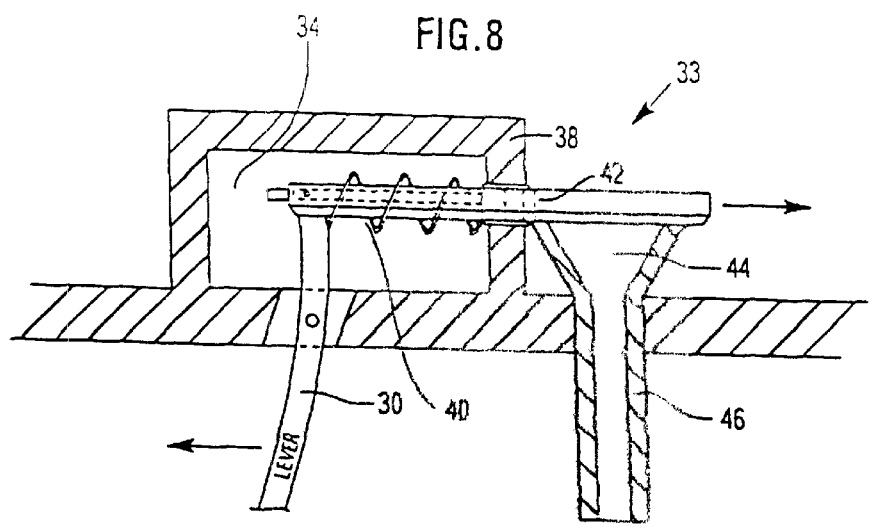

METHOD FOR PREPARING INFANT FORMULA FROM POWDER WITH DISPENSING AND FILTERING MEANS

CROSS-REFERENCES TO RELATED APPLICATION

This application is is a continuation of U.S. application Ser. No. 09/455,963 filed on Dec. 6, 1999, which is a divisional of U.S. application Ser. No. 08/934,712 filed on Sep. 22, 1997, now U.S. Pat. No. 5,855,236 which is a continuation-in-part of application Ser. No. 08/265,412 filed on Jun. 24, 1994, now U.S. Pat. No. 5,671,325 which is a continuation of U.S. application Ser. No. 07/981,791, filed Nov. 25, 1992, now abandoned.

FIELD OF THE INVENTION

The invention pertains to apparatus and methods for maintaining and supplying a ready source of warm water to mix with powdered infant formula.

BACKGROUND OF THE INVENTION

The health of a baby depends upon, among other things, its nutritional diet. Infant formula has nutritional value similar to mother's milk. Because of its obvious convenience, infant formula is often substituted for mother's milk. However, pediatricians advise that the formula should be fed to a baby at a constant temperature throughout the content and as near to the temperature of the mother's milk as possible.

In addition to the nutritional value of the infant formula, the baby's caregiver is also interested in the expediency with which the formula can be dispensed at the proper and consistent temperature to feed the hungry and crying baby. As more and more parents work outside the home and attempt to cope with their hurried and harried lifestyles, there is an increasing need for faster and more efficient preparation of the baby's formula. The baby's caregivers have little time during the day to devote to preparation of the baby's formula. Additionally, and perhaps most significantly, feedings during the night must also be expedient, since any time required for the feedings reduces the caregiver's own amount of rest and sleep, and may adversely impact the caregiver's normal sleep pattern. The baby is also more inclined to return to sleep if he/she receives the infant formula in a timely manner. Otherwise, if allowed to become agitated when hungry and the food is not immediately forthcoming, the baby may not return to sleep as readily. In locations where water sources are considered to be unsafe or in question, conventional methods and apparatus used to prepare infant formula include boiling tap water for sterilization. After boiling, water is allowed to cool to a tepid temperature and then the water is mixed with powdered or liquid concentrate infant formula. This boil and cool method has several disadvantages. First, this method is very time consuming, requiring several minutes of preparation to bring water to a boiling temperature and then allowing it to cool. Second, if allowed to cool too long, the water must be reheated, resulting in additional preparation time. Third, no ready means for accurately measuring, monitoring and controlling the temperature of the water is available. Fourth, safety of both the baby's caregiver and the baby is at risk. The baby's caregiver could suffer from thermal burns when attempting to pour the boiling water into a container. Further, thermal burns to the baby is a possibility if the water is not allowed to cool sufficiently. Fifth, the energy required to bring water to its boiling point is wasted, as the water must then be allowed to cool.

Another method and apparatus to prepare infant formula is the use of tap water supplied directly from a hot water heater. Water from a hot water faucet is allowed to run while cold water is purged from the water lines and warm water is delivered. This tap water method has several disadvantages. While not as time consuming as the boil and cool method and apparatus, dispensing water at the proper temperature from the faucet can consume several minutes. First, the cold water must be purged from the water lines and replaced with warm water. Then, the temperature of the water must be adjusted to the proper level, which is generally at a lower than desired temperature. Further, the temperature of the water is not monitored and usually consists of the caregiver testing the temperature with his/her finger or hand. This may result in thermal burns. The tap water method also results in waste as the water must run until the proper temperature is achieved.

Microwave ovens are often used to heat infant formula. While this method is often used because of convenience and expediency, it is undesirable because hot spots in the formula may develop, resulting in inconsistent formula temperature. Further, thermal burns to the baby's mouth may result from drinking hot formula. In addition, some studies report that formula heated with microwaves may inhibit the baby's digestion.

Ready liquid formula is an alternative feeding method. However, liquid formula is generally more expensive than powdered infant formula and spoils within 48 hours after opening. Further, the liquid must be refrigerated to prevent spoilage even within the 48 hour period. In addition, a method to heat the liquid formula is required when warm formula is desired. Many times a unit to warm a baby bottle containing liquid formula is used. However, these units, generally take several minutes to warm first the bottle and then the formula contained inside the bottle. Further, no ready means for monitoring and adjusting the temperature of the formula is available.

A method and apparatus for supplying water for mixing infant formula using liquid concentrate is described in U.S. Pat. No. 3,352,460 (the '460 patent). The '460 patent discloses a storage and dispensing device for liquid infant formula which includes two compartments. One compartment refrigerates and stores the liquid formula concentrate. The other compartment holds hot water that is dispensed with the liquid formula into a bottle. The water is heated with an electric element which is controlled by a thermostat. Such a device has several disadvantages. First, the water is supplied only at a very high temperature range such that when mixed with the refrigerated pre-chilled liquid concentrate, the temperature of the resulting mixture is lowered to a range suitable for a baby. Thus, the water provided, if dispensed singularly, would be at a temperature too high for mixing with room temperature powdered infant formula. Second, modifying the apparatus and method is not desirable. Powdered formula would have to be pre-mixed with water and then poured into the cold compartment. Having to pre-mix the powdered infant formula is inconvenient and time consuming. Furthermore, the powdered formula would likely settle to the bottom of the compartment, as the formula and water mixture holds its suspension for a lesser period of time than pre-mixed liquid.

Another disadvantage of the '460 patent is that the device has no means for monitoring or controlling the temperature of the final mixture of water and infant formula. Further, the temperature of the final mixture would need to be controlled by adjusting both the temperature of the hot water and the temperature of the chilled liquid concentrate. Additionally, inconsistent temperatures throughout the mixture may result, with hot spots where more water is present and cold spots where more of the liquid formula concentrate is present. This problem of hot and cold spots could be reduced somewhat by manually stirring the mixture to obtain a homogenous temperature. These disadvantages increase the time and number of steps required to produce a suitable mixture for feeding to a baby.

The device taught by the '460 patent is cumbersome and probably expensive to make and to operate because of its duplicate parts. It contains, among other elements, two reservoirs and a refrigeration unit as well as a heating unit. Not only would these parts be costly to purchase initially, but also costly when replacing worn parts. More electricity is required to operate both the refrigeration unit and the heating unit. More importantly, the temperature of the water cannot be controlled to achieve the appropriate temperature required for powdered infant formula.

Other methods and apparatus pertain to heating water for preparation of hot drinks. Beverage water dispensing units typically dispense water for either hot beverages or cold beverages, but not warm or tepid beverages such as infant formula. Further, a means for selecting and adjusting the temperature of the water is not available. An example of these type units is a coffee maker. The coffee maker dispenses water at too high a temperature for infant formula and typically has no means for temperature selection or monitoring. Another such device is that described in U.S. Pat. No. 4,791,860 (the '860 patent) of Verheijen. A heating unit brings a quantity of water to a high temperature which is then mixed with water at a lower temperature, resulting in a mixture of water at a desired temperature, somewhere between the temperature range of the hot and cooler water components. In addition, the device is connected to an inlet which supplies the water components. Such a device is unsuitable for supplying heated water for mixing with powdered infant formula. The temperature of the final water product may have hot and cold spots throughout because of the mixing of a hot quantity with a cold quantity of water to achieve a mixture having the desired temperature. There is also no indication or readout of the final water temperature.

A method and apparatus for dispensing instant foods is described in U.S. Pat. No. 4,139,125 (the '125 patent) of Arzberger et al. The food dispenser includes a hot water system, water tank and a dehydrated food storage hopper. A funnel receives and mixes hot water from the water tank and dehydrated food from the storage hopper. The food mixture is then discharged from the funnel into a container suitable for receiving the mixture. Such a method and apparatus has several disadvantages for use as a supply of heated water for mixing with powdered infant formula. First, the temperature of the water is too hot for use with powdered infant formula. While hot temperatures are suitable for food such as mashed potatoes and cereal for adults and older children, infant formula must be served at lower temperatures. Second, the temperature of the water cannot be controlled or adjusted to the lower temperatures required for infant formula. Third, modifying the apparatus and method for use with infant formula is undesirable. Even if the water temperature could be adjusted and controlled to lower temperatures, the device is too unwieldy for use as an infant formula dispenser. An infant formula dispenser ideally delivers only warm water. The process and apparatus disclosed in the '125 patent would deliver pre-mixed formula, which has several problems. The powdered formula stored in the hopper would quickly become stale and unusable. Also, the water tank capacity of one gallon of water is too enormous for adaptability for infant formula. Typically, a baby requires only four to eight ounces of formula every two to four hours. A gallon capacity would last between 16 and 32 hours. This would require an excess amount of energy to power the food dispenser for a substantial length of time. Further, the '125 patent has no means to measure the proper amount of water and powdered formula to be mixed together. Additionally, no temperature readout is provided.

The method and apparatus disclosed by the '125 patent is unwieldy and probably expensive to produce and maintain. It contains, among other elements, a large water tank, a dehydrated food storage hopper, and a funnel for mixing of the water and dehydrated food. A corresponding higher amount of energy would be required to operate the various elements of the food dispenser.

SUMMARY OF THE INVENTION

By overcoming the various disadvantages of the previously described devices for supplying heated water, this invention provides a method and apparatus for expediently supplying water at a consistent and ideal temperature that is mixed with powdered infant formula.

In one of its preferred embodiments, the apparatus comprises a reservoir where water is added and then heated to the ideal temperature for mixing with powdered infant formula. Heating water in the reservoir assures that the water temperature is stabilized and maintained at an optimum temperature for infant formula. Further, the water is ready to be dispensed for mixing with the powdered formula whenever a baby's feeding is required. Expediency is at an optimum since the reservoir provides an immediately accessible supply of water at the proper temperature for multiple feedings. This expediency is conducive to better sleep patterns for both the caregiver and the baby.

According to one aspect of the invention, the apparatus includes an optimum capacity water reservoir. A baby typically requires only small quantities of formula ranging from four to eight ounces. Thus, a smaller capacity reservoir is advantageous in that the water will be used quickly before becoming stagnant. However, the reservoir is large enough to provide for multiple feedings, which may occur every two to four hours.

In accordance with other aspects of the invention, a filter for filtering out contaminants is installed in an apparatus for heating water to a temperature suitable for oral delivery to an infant. Water is poured into a reservoir through the filter, in one embodiment, or is pumped from a reservoir, through a filter, prior to dispensing for mixing with powdered formula, in another embodiment. Means for disinfecting the water may also be used to sterilize the water prior to mixing with the powdered formula.

In accordance with still further aspects of the invention, a variable temperature setting allows the user of this device to select and control the temperature of the water within a narrow temperature range. Temperature of the water can be maintained slightly warmer or cooler than body temperature, depending on the baby's response at feeding time. The temperature of the formula can be kept consistent at every feeding. Consistency in the formula's temperature is advised by pediatricians as an essential element for the baby's feeding habits. Additionally, powdered formula mixes more efficiently in warm water. Also, continuous monitoring of the water temperature is provided by a temperature readout. Thus, the user knows precisely the formula's temperature and can adjust it according to individual needs and requirements. Temperature control and monitoring can virtually eliminate the possibility of thermal burns to the user or baby.

The water heater for infant formula can operate in any area which has available electrical power. It can also be adapted for use in an automobile. Its use is not limited to areas having an inlet pipe supplying water, as water is poured into the reservoir, rather than being connected to an inlet pipe. Thus, the device can be located in a room close to the baby or the baby's caregiver, and not restricted to bathrooms or kitchens. However, the device can easily be modified to accept home or public water supply, if so desired.

These and other advantages of the invention are discussed or will be otherwise apparent from the following description of the preferred embodiment of the invention, its illustration in attached drawings, and the appended claims.

BRIEF DESCRIPTION OF THE DRAWINGS

FIG. 2 is a sectional view of the water heater for infant formula shown in FIG. 1, taken along section line 2—2, with portions cut away to display the closed position of a slide action spring valve.

FIG. 3 is a sectional view of the water heater for infant formula similar to FIG. 2 to display the open position of a slide action spring valve.

FIG. 8 is a detail of a valve shown in FIG. 1 with portions cut away.

DETAILED DESCRIPTION OF THE PREFERRED EMBODIMENT

Figure 1:
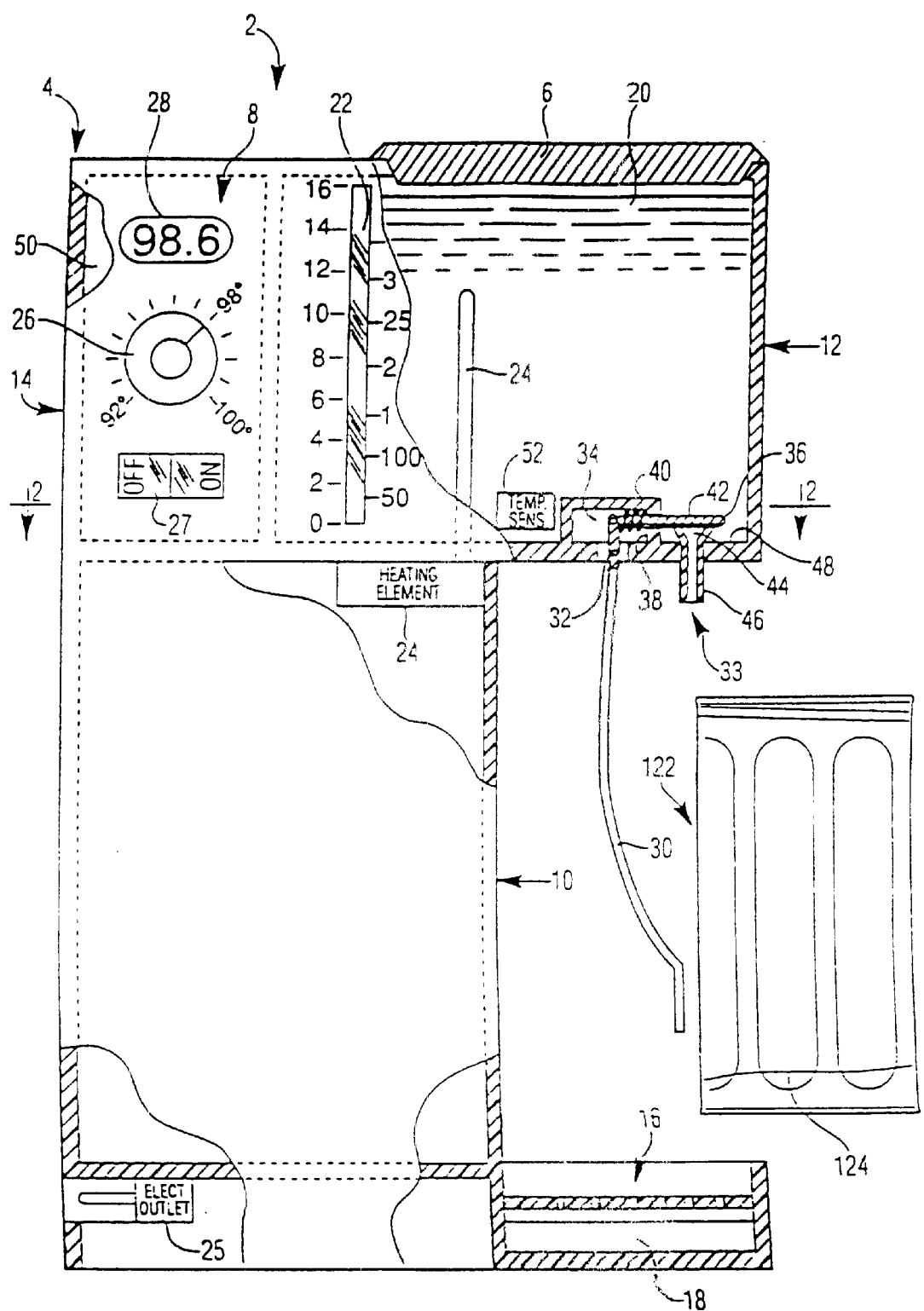
FIG. 1 is a side view of a first exemplary embodiment of a water heater for infant formula with portions cut away to display interior components in elevation.

Referring to FIG. 1, an apparatus 2 for preparing powdered infant formula includes a housing 4 having a water reservoir lid 6, side panel 8, front panels 10 and 12, back panel 14, drip gate 16, and a spillage reservoir 18. The drip gate 16 is a framework of lattice bars which allows spillage of water dispensed from the water reservoir 20 to flow through the drip gate 16 into the spillage reservoir 18. The drip gate 16 is removable to allow easy cleaning of the shallow spillage reservoir 18.

Water reservoir 20 preferably holds 16 fluid ounces or more of water, sufficient for at least four 4-ounce baby feedings or two 8-ounce feedings. The capacity of the reservoir may be larger. However, to reduce the possibility of growth of microorganisms or contamination by foreign material, the amount of stored water should be kept to the minimum necessary for convenience. Furthermore, heating of the water may be more easily and quickly controlled with a smaller heating element to save costs.

The water reservoir lid 6 is removable for pouring water into the water reservoir 20. Tap water is typically used. If the source of the tap water is contaminated, it should be boiled and cooled before pouring into the water reservoir 20. Generally, it is recommended that boiling and cooling of water should occur immediately prior to a baby's naptime or bedtime. The lid should be replaced prior to operation of the water heater to keep out contaminants and retain the heat. A clear window 22 located in the side panel 8 provides for visual inspection of the quantity of water in the water reservoir 20.

Figure 5:
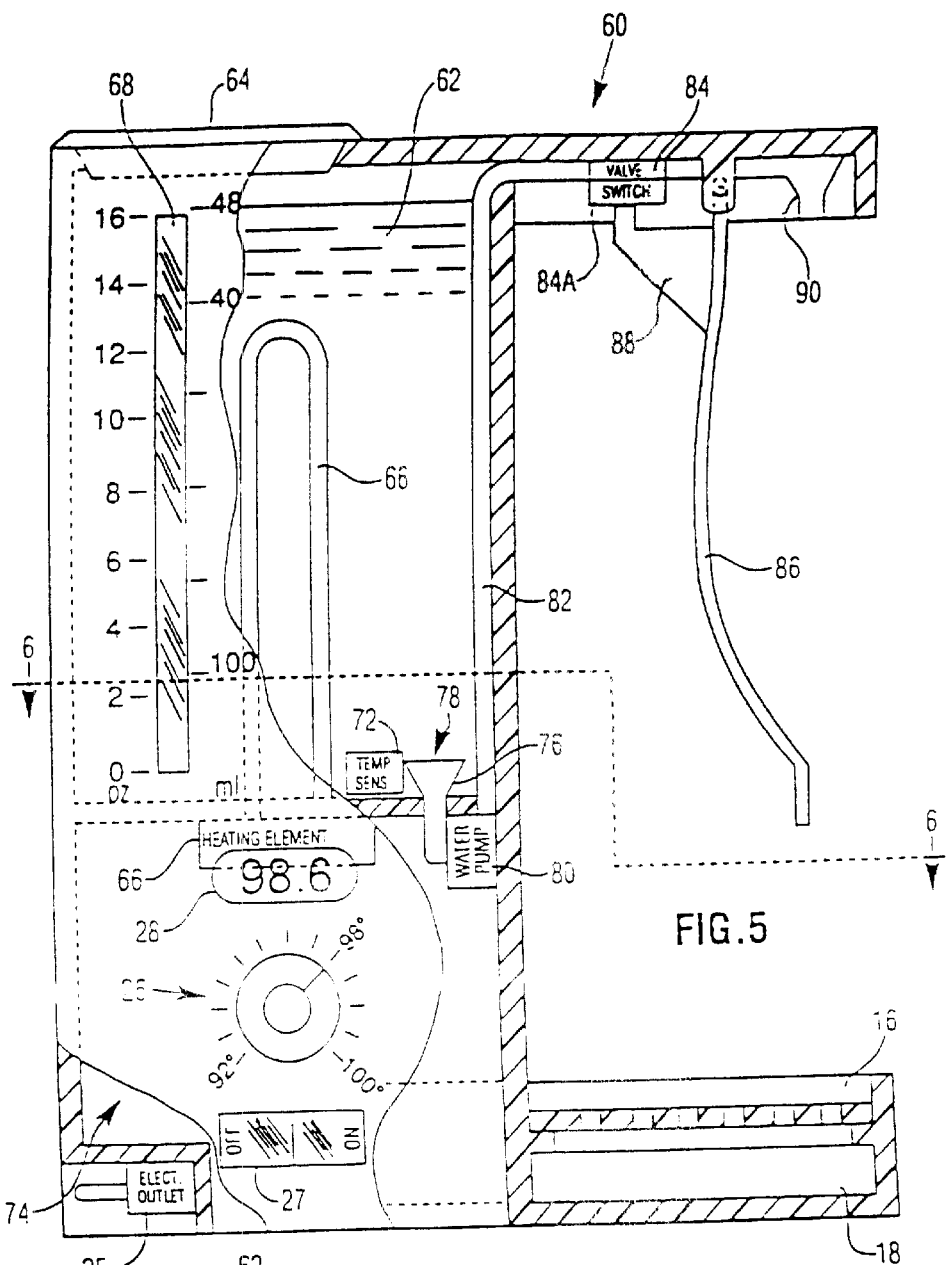
FIG. 5 is a side view of a second exemplary embodiment of a water heater for infant formula with portions cut away to display interior components in elevation.

Heating element 24 of U-shape extends through the floor of reservoir 20 to heat the water evenly and consistently throughout. The heating element 24 is constructed of a material such as stainless steel or ceramic which will not rust or corrode and thereby contaminate the water. The U-shape of the heating element is not limited to the shape that is shown in FIG. 5. For example, the heating element may be in the form of a pad laid on the floor of the reservoir or in the form of a blanket wrapped around the reservoir. Other types of heating elements may also be substituted.

Figure 4:
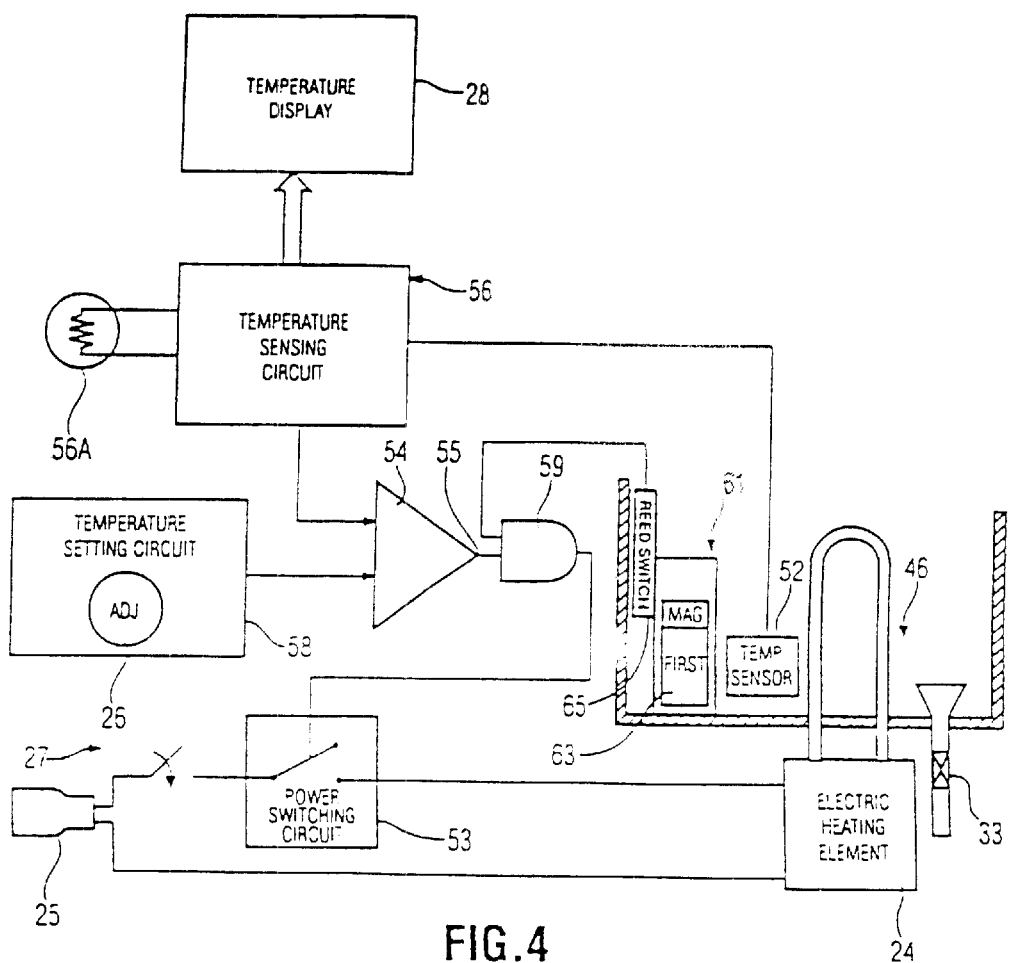
FIG. 4 is a schematic diagram of a thermostatic control circuit.

Power to the heating element 24 is turned on and off by a thermostat schematically illustrated in FIG. 4 to achieve a desired water temperature. Power is delivered with a 120 volt AC current through plug 25. On/off switch 27 turns power on and off to the heating element 24 and thermostat. This switch has an exterior surface of translucent red plastic through which a light, when lit, may be seen and indicates that the water is at a desired water temperature. The desired water temperature is set manually with knob 26. Preferably, as indicated by the scale adjacent knob 26, the water temperature is adjusted over a small range of temperatures from 92° to 100° Fahrenheit, temperatures at which formula is preferable for feeding to an infant. Generally, it has been found that mixing water with powdered infant formula does not significantly lower the temperature of the resulting liquid formula below that of the water constituent. Ideally, the temperature of the water should be the normal body temperature, which temperature averages 98.6° Fahrenheit for most persons. However, temperatures ranging from 70° to 105° Fahrenheit could be provided to meet an individual user's preference. Regardless of the actual temperature, it is most important to provide water instantaneously at a consistent temperature, within a range of temperatures acceptable for the baby to consume the formula, so that the water can be mixed with powdered infant formula and fed immediately to the baby. A display 28 of the temperature is provided to reassure the caregiver that the water temperature is accurate and consistent.

Referring now to FIGS. 1, 2, 3 and 8 collectively, lever 30 is provided to pivot about axis 32 when depressed with a baby bottle 122, having an amount of powdered baby formula indicated by dashed line 124, by placing the bottle's opening beneath funnel 46. One end of the lever extends up into cavity 34 formed within reservoir 20 and activates a valve 33 when pivoted.

Lever 30 operates a valve plate 36. Valve plate extends through an opening wall 38 and into reservoir 20. The plate is sealed against the opening with a grommet. Wall 38 partially forms cavity 34. The valve plate is retained for sliding within horizontal grooves 39, indicated by dashed lines, formed along interior walls of cavity 34. Coaxial with valve plate 36 is a compressed coiled spring 40. The spring, in a compressed state, exerts a biasing force that tends to slide valve plate 36 towards the left to a closed position. The biasing force thus also tends to pivot the lever 30 counter-clockwise. Pressing lever 30 with a bottle rotates the lever clock-wise and slides the valve plate to the right and moves opening 42 over the mouth 44 of funnel 46. Water then flows through funnel 46 and into the bottle. The mouth 44 is located above the floor 48 of the reservoir to prevent any sediment that may collect in the reservoir from flowing through the funnel and into the bottle. Other types of commercially available valves may be used in place of valve plate 36, and may be fitted to funnel 46 below the reservoir, as opposed to its mouth 44, if desired.

The thermostat and electronic circuits (not shown) are located within cavity 50. A temperature sensor 52 is placed in a location in the reservoir 20 that is representative of the average temperature of water that is being dispensed through funnel 46.

A water level sensor 61 prevents power from being supplied to the heating element 24 when the water level in the reservoir falls below a predetermined level to prevent the heating element from getting too hot or burning.

Figure 6:
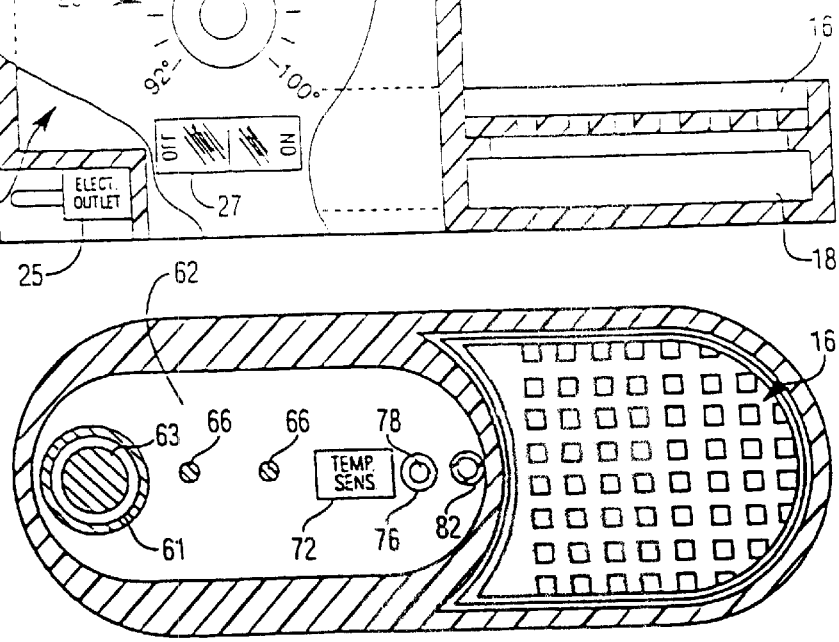
FIG. 6 is a top, cross-sectional view of the water heater for powdered infant formula taken along section line 6—6 in FIG. 5.

Referring now to FIG. 4, shown is a block schematic of the apparatus for preparing infant formula from powder 2 (FIG. 1) with thermostatic control circuitry. This control circuitry is also used in apparatus 60 that is shown in FIGS. 5 and 6. A power switching circuit 53, which can be a relay or a solid state device, turns power on and off to the heating element 24. An output signal from AND gate 59 operates the power switching circuit. AND gate 59 receives on one input a signal from comparator 54 and one from water level sensor 61 disposed within reservoir 20.

Water level sensor 61 includes a float 63 having a magnetic top and a proximity sensor switch 65 for sensing the presence of a magnetic field. The proximity sensor switch is, for example, a reed switch having contacts that are pulled together by the presence of the magnetic field of the magnet on top of the float. The float is upwardly constrained so that anytime the water level is above a minimum, the magnet on the float is near the proximity sensor switch 65 and closes it. When the water drops, the magnet drops away from the proximity sensor switch, and the switch opens. An example of such a water level sensor is found in U.S. Pat. No. 5,576,426 to Sesholtz. The proximity detector switch is connected by an appropriate logic circuit to one input of AND gate 59, so as to provide a logic signal indicating whether the water is above or below the minimum level. Other types of water level sensors may be substituted.

The comparator circuit 54 receives a signal indicative of the temperature of water in the reservoir from a temperature sensing circuit 56 and a signal from temperature setting circuit 58 representative of a set temperature. It compares the two signals and provides a signal on line 55 indicating whether the water temperature is above or below the set temperature. The temperature sensing circuit is coupled to the sensor 52. Sensor 52 is preferably a thermistor located within the reservoir in a location representative of the average temperature of the water being dispensed through funnel 46. The set temperature of the temperature select circuit 58 is set by the user with knob 26. The temperature select circuit may be combined with the temperature sensing circuit. For example, the thermistor and a variable resistor may be incorporated into the same bridge or voltage-dividing circuit. The temperature sensing circuit 56 illuminates light 56A, which is placed behind a translucent portion of switch 27, when the temperature of the water is within range of a desired temperature.

Power switching circuit 53 is closed to provide power to heating element 24 only when the AND gate receives a logic signal from the proximity detector switch that indicates the water level is above the minimum water level and when the comparator 54 provides a logic signal indicating that the water temperature is below the set temperature indicated by the signal from temperature select circuit 58. Otherwise, the power switching circuit is open.

The temperature select circuit also provides a signal or signals indicating the actual water temperature to display 28. Either the temperature sensing circuit 56 or display 28 is provided with the circuitry necessary to create the desired display, whether it is a digital LED or LCD readout, as shown, or an analog dial.

Other types of thermostats which have sensitivity capable of maintaining the temperature of water within the desired range may be substituted. One example of an electronic circuit is found in U.S. Pat. No. 5,063,836, issued Nov. 12, 1991, which is incorporated herein by reference. The thermostat may also be a conventional mechanical circuit. Furthermore, the thermostat and heater may be incorporated into a single unit and placed in the reservoir. An example of such units, commonly used in aquariums, is shown in U.S. Pat. No. 4,142,793.

Unlike coffee makers and other types of water heaters, heating element 24 preferably heats the water relatively slowly. Slow heating helps to assure that the temperature throughout the reservoir is relatively consistent and free of hot spots. Slow heating allows good thermostatic control to avoid overshooting the set temperature. Measurement of the temperature of the water in the reservoir is more accurate and placement of sensor 52 is less critical because of the relatively constant temperature distribution.

Referring now to FIGS. 5 and 6, an alternative embodiment of a water heater for powdered infant formula 60 employs a water pump to deliver water, as opposed to the gravity flow system shown in FIGS. 1–3. Water is poured into reservoir 62 by removing cap 64. Like the embodiment of FIGS. 1–3, water is heated to and maintained at a desired temperature with a heating element 66 that extends into the reservoir. A window 68 shows the amount of water in the reservoir 62.

The temperature of the water is set by the user turning knob 26. A temperature sensor 72, schematically illustrated, is located within the reservoir at a location representative of the average temperature of the water being dispensed. The temperature sensor and the heating element 66 are coupled to the thermostat and temperature setting and sensing circuitry shown in FIG. 4. This circuitry is located in electronics cavity 74.

Extending through the floor of reservoir 62 is a funnel 76 for receiving water. Mouth 78 of the funnel is located above the floor a certain distance so as to avoid drawing in any sediment that may collect on the floor of the reservoir. The funnel flows water to an input of water pump 80. The output of the water pump is connected to tube 82. Tube 82 runs along the inside of the reservoir so that water in the tube is not cooled by the ambient room temperature and can be generally maintained at the desired temperature. The tube transports water under pressure up to valve 84. Valve 84 is spring loaded and normally closed. It is opened by a bottle (not shown) pressing against lever 86. Displacement of lever 86 moves arm 88 against an actuator pin in the valve that opens the valve and simultaneously operates a switch 84A to turn on water pump 80. Water is then pumped from the reservoir and delivered into the bottle through spigot 90. Alternatively, the valve may be omitted. In this case, lever 86 operates a switch that turns on water pump 80. Another alternative is that water pump 80 may be pressure sensitive and operate whenever the pressure in tube 82 drops below a predetermined level when valve 84 is opened.

A drip grate 16 is placed over a shallow spillage reservoir 18 to catch dripping water from spigot 90.

Figure 7:
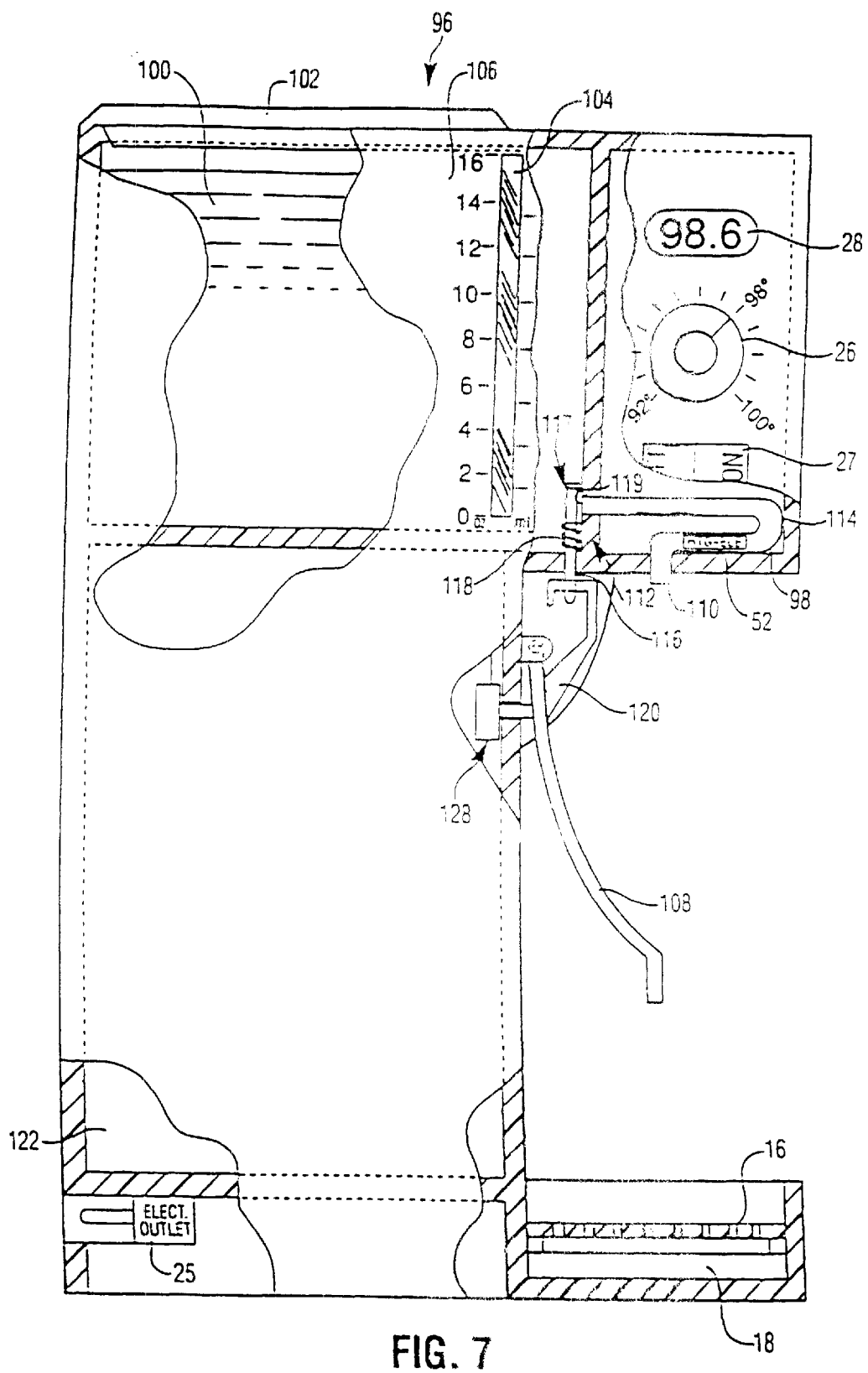
FIG. 7 is a side view of a third exemplary embodiment of a water heater for infant formula with portions cut away to display interior components in elevation.

Referring now to FIG. 7, an alternative embodiment of a water heater for powdered infant formula 96 is shown partially in section. A line heater 98 is used in place of a heated reservoir. Reservoir 100 is filled with water by removing lid 102. A window 104 on an outer wall 106 of the reservoir shows the water level in the reservoir. The scale next to the window indicates the volume of water left in fluid ounces and milliliters.

A baby bottle (not shown) is pressed against lever 108 to position the opening of the baby bottle beneath spigot 110 and to open valve 112. Opening valve 112 allows water to flow, under the force of gravity, into water line 114, past line heater 98 and out spigot 110. Valve 112 includes a plate 116 with an orifice 117. Plate 116 slides vertically in front of opening 119 to water line 114. Plate 116 is biased to a closed position by spring 118. In the closed position, the orifice 117 in plate 116 is not aligned with opening 119 of the water line 114; the plate serves to block the flow of water. To open the valve, lever 108 is depressed, which causes arm 120 to pull down on plate 116, aligning orifice 117 with the opening 119.

Line heater 98 is in essence a heat exchanger for imparting thermal energy to a given volume of water passing through it. The heating element is heated by passing current through a resistive element that heats a thermal reservoir for storing a determined amount of thermal energy. The amount of thermal energy transferred by the line heater to the water during dispensing should be sufficient to raise the volume of water dispensed into a baby bottle to the desired temperature or within a range of desirable temperatures between 92 and 100 degrees Fahrenheit. To achieve the most predictable transfer of heat to the water, the temperature and flow rate of the water in the reservoir 100 should be kept relatively constant. Also, the flow of heat into the thermal reservoir of the line heater should be sufficient to maintain a relatively constant heat transfer rate to the water throughout the period of water flow through the line heater during dispensing.

The line heater 98 is preheated by turning on power switch 27. Its temperature, indicative of the amount of the thermal energy stored by it, is regulated by a thermostatic control circuit in cavity 122, such as the one shown in FIG. 4, having a set temperature manually adjustable with knob 26. Temperature sensor 52 (schematically illustrated), which preferably is a thermistor, provides a signal indicative to the thermostatic control circuit for use in regulating the temperature of the water and displaying the temperature on display 28. Although the water is supplied under pressure supplied by gravity, a pump may be included, if desired, to provide a more consistent flow of water and therefore aid in providing more consistent water temperature.

Given the difficulty of accurately controlling the reservoir water temperature, the flow rates, and the heating of the line heater, using a line heater is less preferred than a heated reservoir to heat the water to the desired temperature in the bottle. For example, if the heat transfer rate of the line heater changes during flow of the water, the volume of the water dispensed may have to be limited to a particular volume to achieve a consistent desired water temperature in the bottle.

Turning now, generally, to FIGS. 9–12, to filter contaminates from the water, the forgoing apparatuses may be adapted to include a filter or system of filters in order to remove contaminates from water being dispensed into the baby bottle. There are various different types of filters which may be used, each with different properties. These filters may be combined, if desired.

Figure 9:
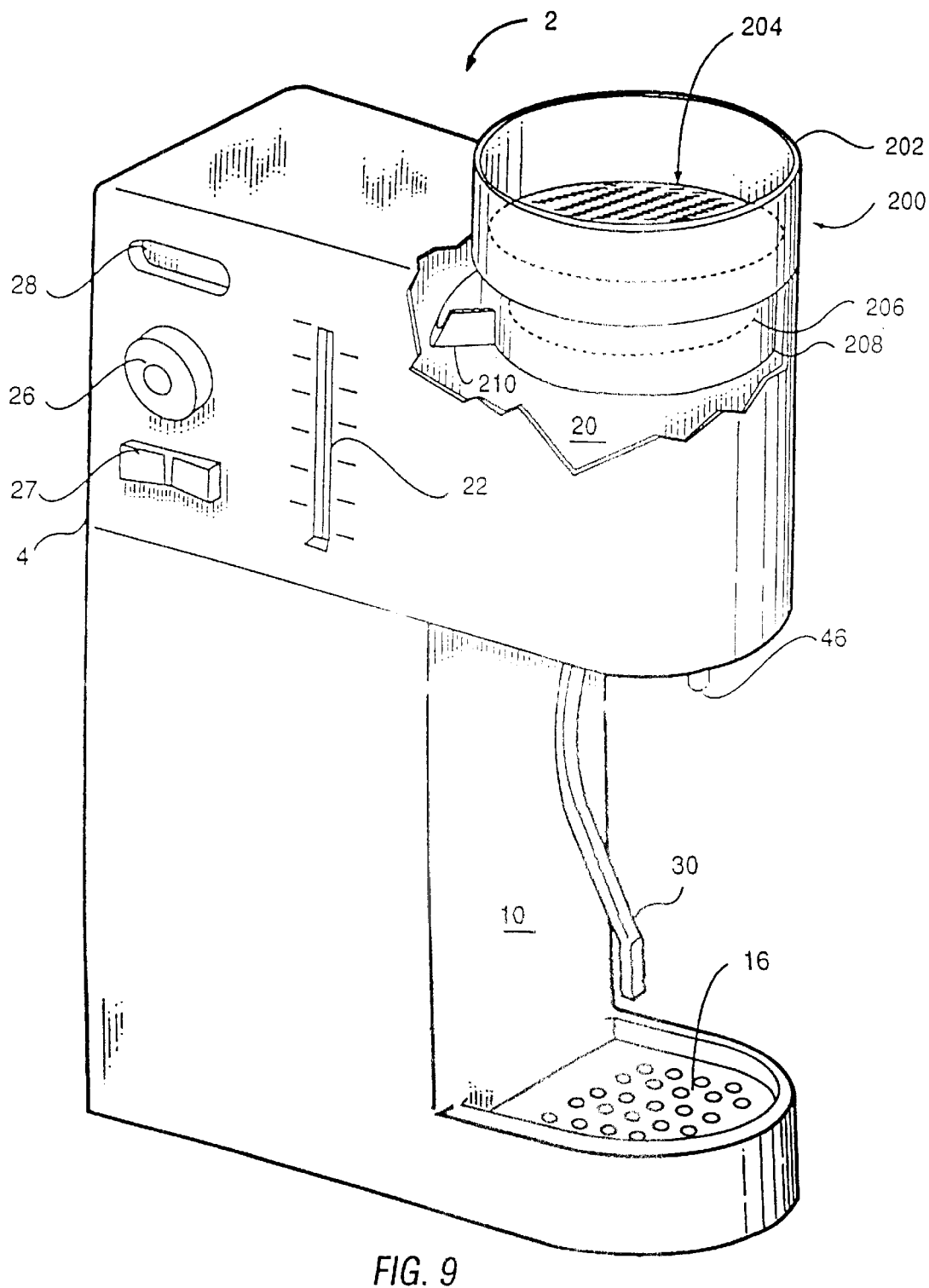
FIG. 9 is a perspective view of an apparatus for preparing infant formula having a filter disposed on an opening to a reservoir.

Referring now to FIG. 9, in another embodiment of apparatus 2 for preparing infant formula from powder, a removable and replaceable, gravity-flow, filtering device 200 is mounted within an opening housing 4 to the reservoir 20, in place of a cover 6 (see FIG. 1). The filter device is designed to be sit within the opening, so that it can be removed by pulling up on the device in order to easily replace the device's filter media 206. Filtering device 200 filters water as it is poured into the reservoir. It includes a pan 202, having a grated bottom 204, in which water may accumulate as it is being poured. The accumulation pan establishes a pressure head to help push water through the filter, and it also accommodates water that is being poured at a rate greater than the rate it is flowing through the filter. Filter media 206 is supported within the device, so that water draining through the grated bottom 204 of the pan flows through it and into a collection pan 206 below under the force of gravity. The filter media removes contaminates from the water. It may include activated carbon or other type of media that removes contaminates from water and works under relatively low pressures. The collection pan includes a spout 210 for emptying purified water into the reservoir 20.

Figure 10:
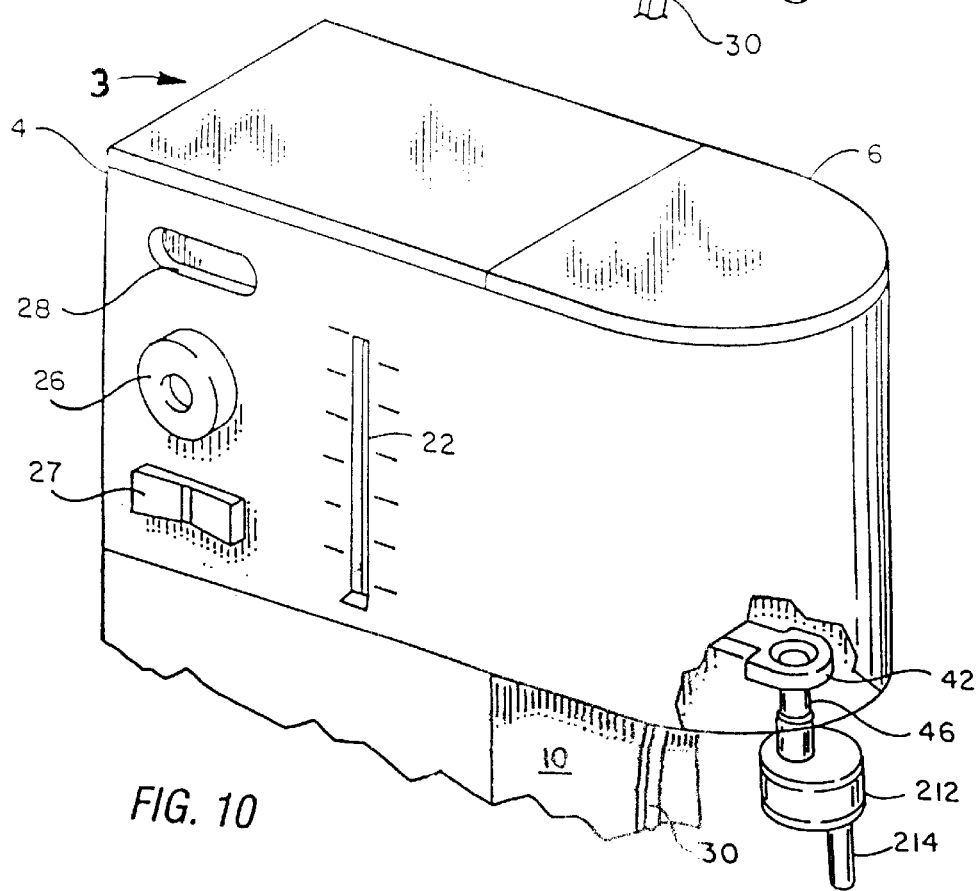
FIG. 10 is a perspective view of an apparatus for preparing infant formula having a filter disposed at an outlet.

Referring now to FIG. 10, a filtering device 212 can be placed instead on outlet 46 of the reservoir to purify water as it is being dispensed. Alternatively, the filtering device can be placed elsewhere in a path in a flow of water from the reservoir and into a baby bottle. However, by attaching it to the outlet 46, the filtering device is easily replaceable or removable, and yet, as opposed to simply placing it on top of a baby bottle, can remain on the apparatus so that it is not lost. Although shown in connection with an apparatus 2 with a reservoir arranged for gravity feed dispensing, a filtering device could be included on the end of spigot 90 of the pump driven dispensing apparatus 60 shown in FIG. 5.

Figure 11:
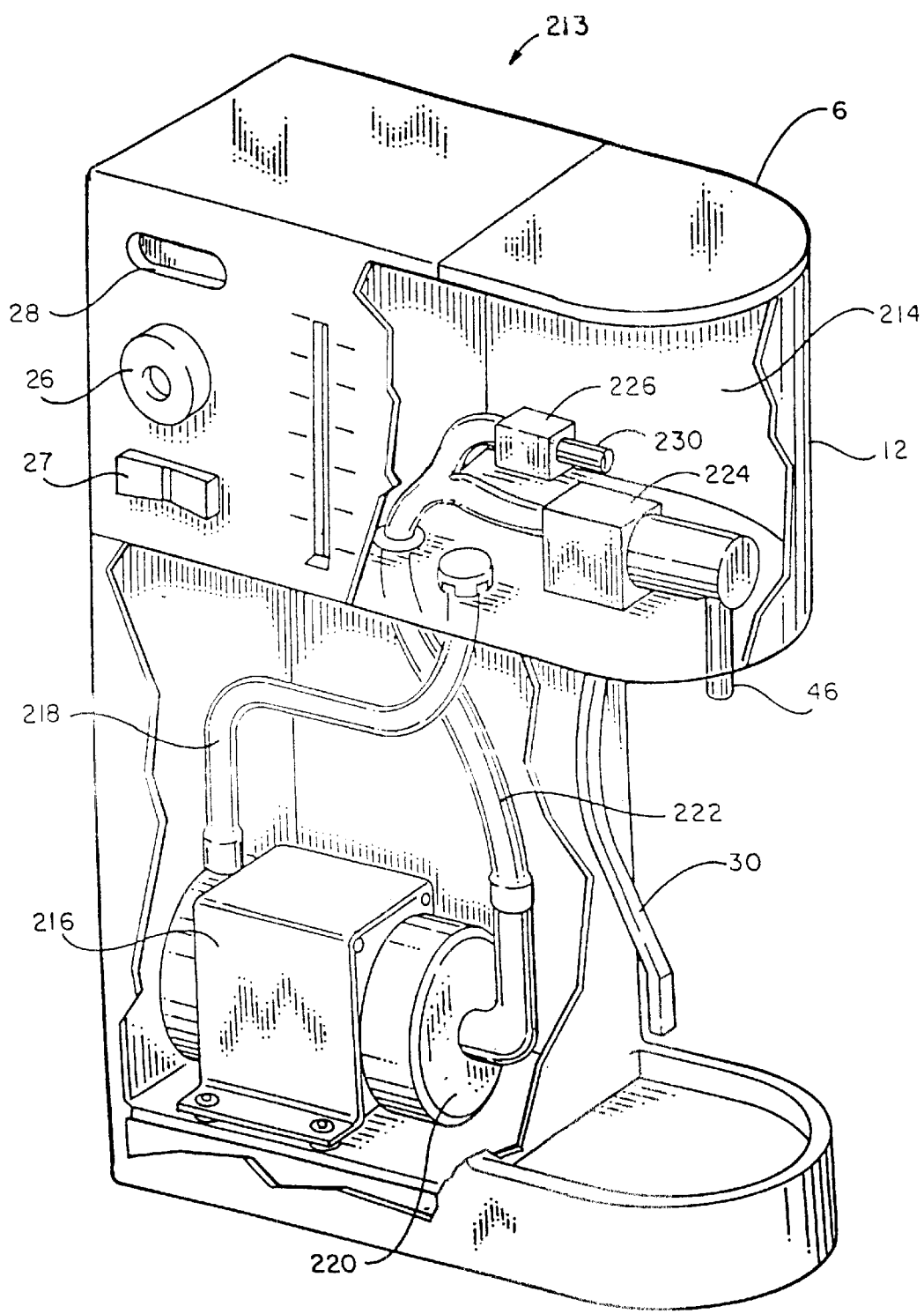
FIG. 11 is a partially cut-away perspective view of an apparatus for preparing infant formula having a pump and a filter.

Referring now to FIG. 11, apparatus 213 for preparing infant formula includes a reservoir 214 for holding water for dispensing. Water is poured into the reservoir through removable cover 6. Pump 216 draws in, through hose 218, water from the reservoir and delivers it under pressure to an inlet (not shown) of filter and/or disinfecting system 220. The filter system 220 can include any type of filter, filtering system or disinfecting system that requires that the water be under substantial pressure, such as a reverse osmosis filter. As compared to an activated carbon filter, a reverse osmosis filter is more effective, tends to remove more contaminates as it can filter out bacteria and other materials having larger molecular structures. However, a pressure greater than the head of water in the reservoir is required to force water throughout.

An outlet of the filter 220 is connected to return hose 222. The return hose splits at a "y" junction, and the ends of the hoses terminate at dispensing valve 224 and pressure-relief valve 226. The dispensing valve, or spigot valve, is operated by dispensing lever 30, for allowing water to flow through outlet 46, into a bottle (not shown) which is positioned beneath it, in a manner that depresses the lever and opens the valve. The dispensing valve is normally biased to a closed position. The pressure relief valve 226 opens when the pressure in the return hose 222 reaches relief pressure greater than the pressure in hose 222 when the dispensing valve 224 is open. When the pressure relief valve is open, water is pumped into the reservoir through outlet 230. This allows the pump to be turn on, if desired, to recirculate water in the reservoir through the filter 220. If the pump is not already on for recirculating water, depressing of lever 30 will turn the pump on for dispensing.

The filter 220 could also include a series of filters, such as an activated carbon filter and a membrane for filtering smaller particles. Furthermore, it can incorporate an ultraviolet lamp for disinfecting the water as it passes through the filter. Disinfecting the water with ultraviolet radiation will kill most of the bacteria and other microorganisms which may be present in the water. Alternately, an ultraviolet lamp could be placed separately into water flow path, separately from filter 220, so that water is pumped past during dispensing or recirculation.

Figure 12:
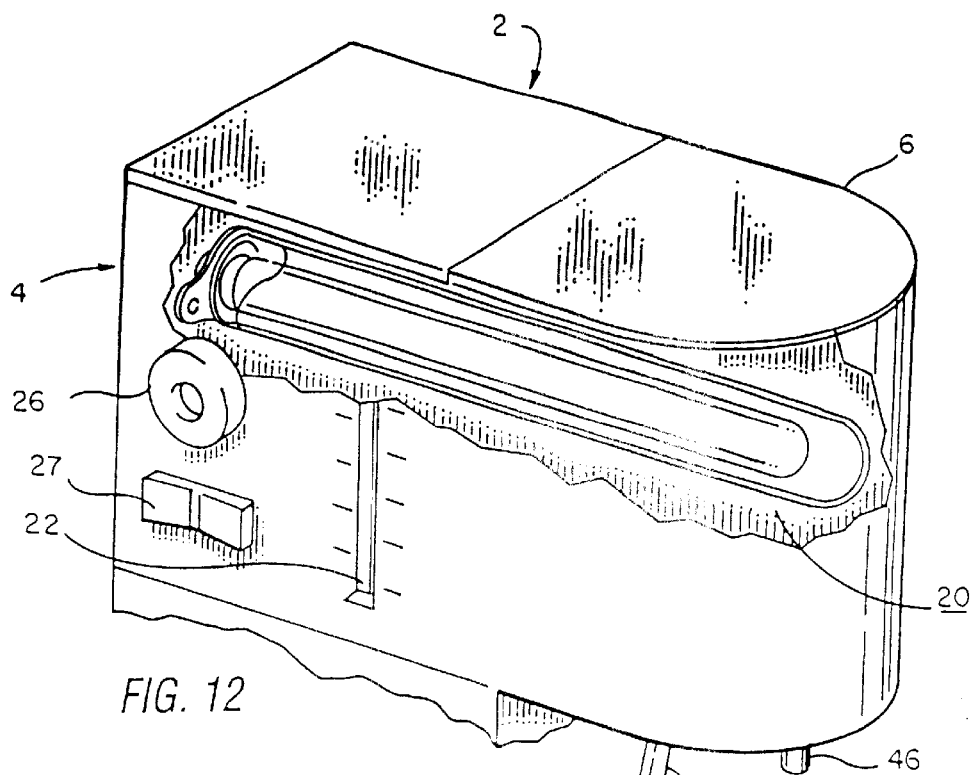
FIG. 12 is a partially cut away perspective view of an apparatus for preparing infant formula with an ultra-violet lamp mounted in the reservoir.

Referring now to FIG. 12, to sterilize or disinfect water in reservoir 20 of apparatus 2 for preparing infant formula from powder, an ultra-violet lamp is mounted within the reservoir 20, for shining on the water in the reservoir to disinfect bacteria and other microorganisms. The ultra-violet lamp may also be mounted in the reservoirs of the apparatus shown in FIGS. 9 and 10.

The forgoing are exemplary embodiments of the invention. Modifications to these embodiments may be made without departing from the scope and spirit of the invention, which is limited only by the following claims.

What is claimed is:

1. An apparatus for preparing baby formula comprising:

a manually portable housing for freely standing on a surface for supporting a reservoir for holding a supply of water;

a heating element for heating the water in the reservoir to a predetermined set point with a range of temperatures having an upper limit at which infant formula may still be safely fed to a baby;

a thermostat for controlling warming of the water to the set point for an extended period until ready for use, the thermostat including means for sensing the temperature of the water and, response thereto, controlling coupling of power source to the heating element;

a spigot mounted dispensing liquid into a baby bottle positioned for receiving water dispensed from the reservoir through the spigot; and a filter for filtering micro-organisms out of the water prior to it being dispensed.

* * * * *